United States Patent
Mower et al.

(10) Patent No.: US 7,167,504 B1
(45) Date of Patent: Jan. 23, 2007

(54) SYSTEM AND METHOD FOR FAST DATA RATE DISCOVERY FROM PN CODES

(75) Inventors: Vaughn L. Mower, Bountiful, UT (US); Merle L. Keller, Salt Lake City, UT (US); Kent R. Bruening, Sandy, UT (US); Steve J. McEntire, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 779 days.

(21) Appl. No.: 10/352,295

(22) Filed: Jan. 27, 2003

(51) Int. Cl.
*H04B 1/00* (2006.01)
(52) U.S. Cl. ...................... 375/142; 375/146
(58) Field of Classification Search ........ 375/140–142, 375/146–148, 150, 152; 370/208, 335, 342, 370/468
See application file for complete search history.

(56) References Cited

U.S. PATENT DOCUMENTS

| | | | |
|---|---|---|---|
| 5,726,661 A * | 3/1998 | Fuji | 342/359 |
| 5,943,361 A * | 8/1999 | Gilhousen et al. | 375/142 |
| 6,226,320 B1 * | 5/2001 | Hakkinen et al. | 375/225 |
| 6,434,390 B1 * | 8/2002 | Rahman | 455/440 |
| 2003/0108085 A1 | 6/2003 | Keller et al. | 375/145 |
| 2003/0161383 A1 | 8/2003 | Mower et al. | 375/130 |

* cited by examiner

*Primary Examiner*—Jay K. Patel
*Assistant Examiner*—David B. Lugo
(74) *Attorney, Agent, or Firm*—Harrington & Smith, LLP (57) ABSTRACT

This invention generates pseudo-noise (PN) codes that map a transmitted data rate into the PN code structure. This invention further then acquires the PN code to automatically discover the transmitted data rate. This invention is operable with communication systems that utilize GPS time synchronization of the transmitted and received PN codes, as well as with communication systems where GPS time synchronization is not available. A method and a system are disclosed to transmit a modulated signal from a transmitter to a receiver, where the modulated signal has a data rate. The method includes selecting, to represent the data rate, at least one PN component code from a set of PN component codes. The PN component code is a constituent code of a composite PN code comprised of a plurality of PN component codes. The selected PN component code is one that phase aligns with a PN composite encoded signal. The method further includes modulating the signal to be transmitted using the PN composite code that includes the selected PN component code, receiving the modulated signal, demodulating the received signal using a demodulation process and discovering the data rate during the demodulation process. The demodulation process includes generating instances of a plurality of PN component codes, and correlating the received modulated signal either sequentially or in parallel with the instances of the PN component codes.

28 Claims, 10 Drawing Sheets

FIG.5A  $S_2$
FIG.5B  $S_1$
FIG.5C  $S_0$
FIG.5D  MASTER CLOCK
FIG.5E  X-EPOCH

DATA CLOCK GENERATION EXAMPLE FROM MASTER CLOCK AND X-EPOCH ($S_0 S_2$ SHOWN)

SYSTEM AND METHOD FOR FAST DATA RATE DISCOVERY FROM PN CODES

FIELD OF THE INVENTION

The present invention relates to spread spectrum (SS) communication systems using Pseudo-Noise (PN) coding techniques and, more particularly, to a method and system for determining a data rate from a PN code.

BACKGROUND OF THE INVENTION

Spread spectrum (SS) systems, which may be CDMA systems, are well known in the art. SS systems can employ a transmission technique in which a pseudo-noise (PN) code is used as a modulating waveform to spread the signal energy over a bandwidth much greater than the signal information bandwidth. At the receiver the signal is despread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further.

Generally, the data rate of the SS transmitted signal is known a priori. This is accomplished either by providing a fixed data rate system, or by varying the data rate in a predictable manner, such as by varying the data rate according to a particular time or day. The DSSS signal is then acquired and data extracted using a filter matched to the known data rate.

For applications when the current data rate is unknown, a sequential search of the data may be accomplished to determine if received demultiplexed data is valid. If the data is found to be invalid, then this can indicate that an incorrect data rate was assumed, resulting in another data rate being selected and tested.

Other known techniques involve sequentially searching PN codes until the correct code correlation is achieved. It will be appreciated that these PN codes are preferably relatively short, and not codes that repeat at time scales on the order of days or weeks. A "short" PN code, as defined herein by example only, is a PN code of length on the order of about 1000 chips that has a duration of about a second or less.

In one type of system of interest to the teachings of this invention a broadcast data link originates from a central airborne terminal (hereafter referred to as the Central Terminal) whose exact position is not necessarily known a priori by the intended receiver (hereafter referred to as the Receive Terminal).

A Receive Terminal, using a directional antenna, decreases beamwidth (i.e., search sector) with increased antenna gain to locate the Central Terminal and to receive the signal within the receiving antenna beam. The Receive Terminal automatically acquires the Central Terminal location either by pointing its antenna at the Central Terminal coordinates (latitude, longitude, altitude), or by using known antenna tracking schemes that systematically and automatically position the Receive Terminal antenna to obtain the highest received signal strength, preferably without the need to first demodulate the received signal. When an antenna open-loop pointing method is used (i.e., one that directs the antenna to a point in space without evaluating the signal strength at that point in space), the received signal is rapidly demodulated in order to extract antenna pointing information. In this context the antenna pointing information includes information that is used to point the antenna of the Receive Terminal towards the coordinates of the Central Terminal, i.e., towards the location of the Central Terminal.

The Central Terminal sets the data rate at some Rate $R_i (i=0,1, \ldots n-1)$ without the Receive Terminal knowing a priori which rate is being transmitted. One method for receiving and properly demodulating the data is for the Receive Terminal's demodulator and demultiplexer to sequentially attempt to demodulate and demultiplex the received data at each $R_i$ rate. In this case the PN code structure is the same for all data rates, while the rate of the underlying data changes. All rate combinations may be sequentially searched after PN detection/correlation to determine valid data synchronization in the demultiplexer. An unsuccessful attempt to demultiplex the data at a given assumed data rate results in the data rate being changed, and another rate search being initiated. This process continues until the demultiplexing of data is successful.

The foregoing technique has several disadvantages associated with its use: 1) the sequential search (including demultiplexing of data) takes a relatively long time, and 2) the sequential search complicates the spatial search problem for a Central Terminal that may move out of the Receive Terminal's main beam during the sequential search.

It can thus be appreciated that a need exists to provide an antenna spatial search and a data rate discovery method and system where the data rate discovery operation does not impede or slow down the antenna spatial search operation.

SUMMARY OF THE INVENTION

The foregoing and other problems are overcome, and other advantages are realized, in accordance with the presently preferred embodiments of these teachings.

This invention advantageously generates PN codes that map a transmitted data rate into the PN code structure. This invention further then acquires the PN code to automatically discover the transmitted data rate. This invention is operable with communication systems that utilize GPS time synchronization of the transmitted and received PN codes, as well as with communication systems where GPS time synchronization is unavailable.

This invention provides a method and a system to transmit a modulated signal from a transmitter to a receiver, where the modulated signal has a data rate. The method includes selecting, to represent the data rate, at least one pseudo-noise (PN) component code from a set of PN component codes. The PN component code is a constituent code of a composite PN code comprised of a plurality of PN component codes. The selected PN component code is one that phase aligns with a PN composite encoded signal. The method further includes modulating the signal to be transmitted using the PN composite code that includes the selected PN component code, receiving the modulated signal, demodulating the received signal using a demodulation process and discovering the data rate during the demodulation process. The demodulation process includes generating instances of a plurality of PN component codes, and correlating the received modulated signal either sequentially or in parallel with the instances of the PN component codes.

In the presently preferred, but non-limiting embodiment, the composite PN code is constructed to include an X PN component code, a Y PN component code and a Z PN component code. Each component code has an epoch of a different duration such that the X PN component code epoch is shorter than the Y PN component code epoch, and such that the Y PN component code epoch is shorter than the Z PN component code epoch. In this embodiment the selected PN component code can be the X PN component code, or it may be the X PN component code and the Y PN component code.

Modulating the signal to be transmitted can involve operating a MAND PN code combiner for combining the selected X PN component code with Y and Z PN component codes to produce the PN composite code according to $X_i \oplus (Y \cdot Z)$.

In a further embodiment of this invention, modulating the signal to be transmitted can involve operating a MOD PN code combiner for combining at least one selected PN component code with another PN component code or codes to produce the PN composite code according to $X_i \oplus Y \oplus Z$.

Modulating the signal to be transmitted can involve operating a plurality of PN component code generators each generating PN codes whose prime factors are unique from each of the other PN codes, where at least two of the plurality of PN component codes have at least one common epoch point.

The demodulation process can include generating instances of a plurality of PN component codes, and correlating the received modulated signal using one of a partial correlation search method or a full correlation search method using the generated instances of the PN component codes.

The demodulation process can include generating p instances of PN component codes, and correlating the received modulated signal using p correlators in parallel, such as by using p rake correlators in parallel.

The method further includes controllably pointing a receive antenna at a transmit antenna using the demodulated received signal.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

This invention pertains to, and will be described in the context of, a method and system for determining a data rate of a direct sequence spread spectrum (DSSS) signal with a pseudo-noise (PN) spreading code structured by a transmitter. The PN code may be of any suitable and desired period or epoch, such as days, years, or decades in length. By "period" or "epoch" of the PN code what is meant is the duration of the time from the start of the PN code to the end of the PN code where the PN code "rolls-over" and begins to repeat.

Figure 1:
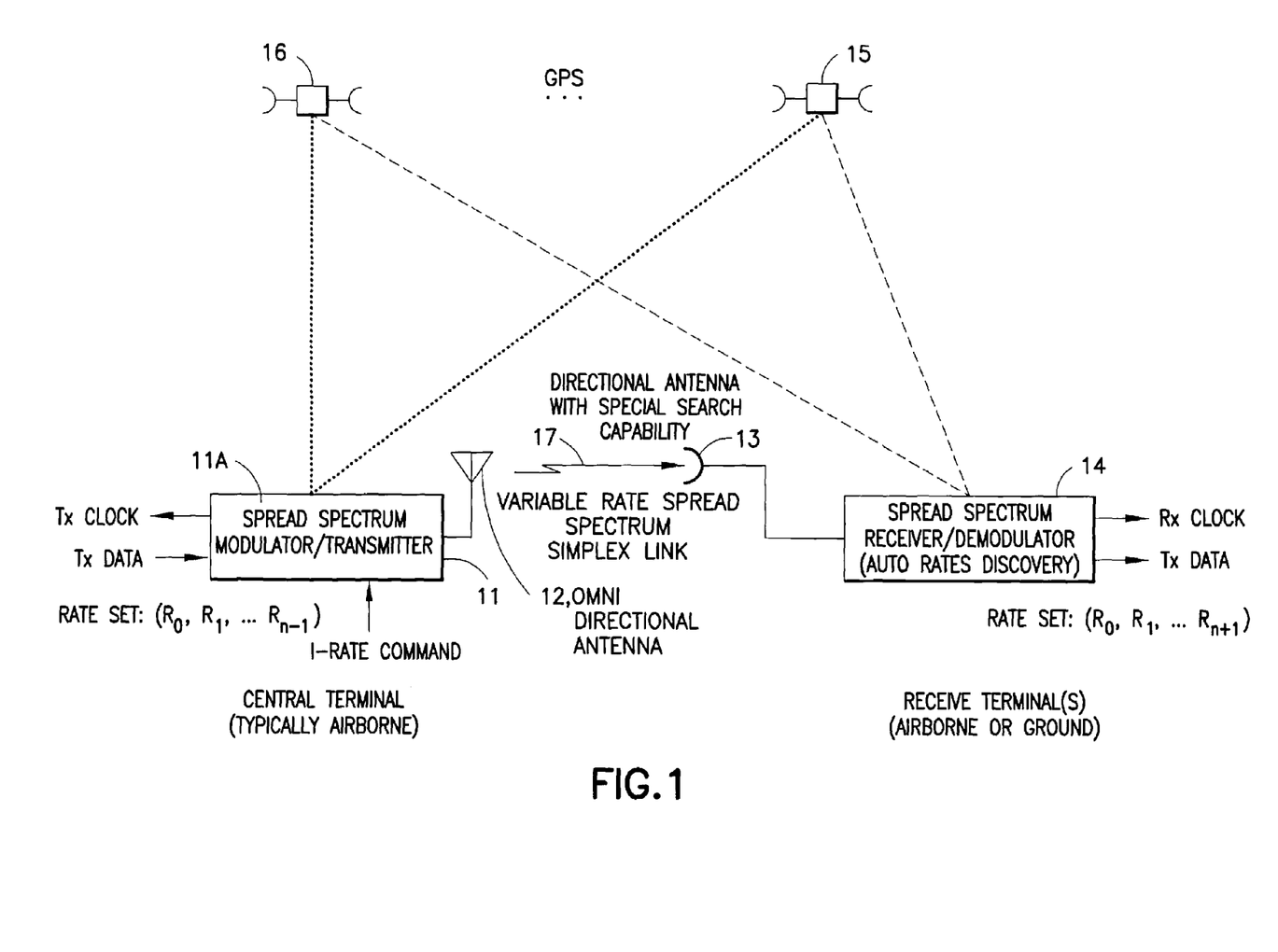
FIG. 1 is a pictorial diagram of a variable rate simplex spread spectrum system incorporating features of the present invention.

Referring to FIG. 1, there is shown a variable rate simplex SS system incorporating features of the present invention. Modulated data is broadcast from a Central Terminal 11 (which may be an airborne terminal) to at least one intended receiver 14 (hereafter referred to as the Receive Terminal). The exact position of the Central Terminal 11 need not be known a priori by the Receive Terminal 14. The Receive Terminal 14 may be an airborne terminal, or it may be a terrestrially-based (including a sea-going) terminal. The Receive Terminal 14 includes an antenna system 13 that is preferably directional in nature to provide sufficient antenna gain to acquire a transmitted signal 17. The Central Terminal 11 includes an antenna system 12 that is preferably omnidirectional but, in alternate embodiments, may be any suitable type of antenna system. The transmitted signal 17 may define a variable rate, spread spectrum simplex link between the Central Terminal 11 and the Receive Terminal 14.

As the Receive Terminal antenna 13 beamwidth decreases with increased antenna gain, the Receive Terminal antenna system 13 performs a spatial search to locate the Central Terminal 11 and to receive the signal 17 within the receiving antenna 13 main beam. As an example, the beamwidth of the receive antenna 13 may be only one or two degrees. Once the received signal is acquired, the Receive Terminal 14 automatically tracks the Central Terminal 11 location either by pointing its antenna 13 at the Central Terminal coordinates (latitude, longitude, elevation), or by using any suitable known antenna tracking schemes that automatically position the antenna 13 based on at least one reception-based criterion. When an antenna pointing method is used, the information required to track the Central Terminal 11 position is preferably extracted rapidly from demodulated data in accordance with the teachings of this invention.

In accordance with an aspect of this invention a transmitted PN code is constructed or defined as a function of a desired data rate. In addition, the PN code is also constructed to enable:

1) a partial-correlation search (of MAND code) of the received signal when the composite code phase of the transmitted signal is unknown by the intended receiver; and/or 2) a full-correlation search of the received signal when the composite code phase is known as a result of a common synchronization event, such as may be obtained using the Global Positioning Satellite (GPS) system.

Note that an arbitrary map may exist between the PN code and the data rate(s). In this example a lookup table would most likely not be a practical solution, due at least to the presence of potentially moving platforms (Central Terminal 11 and/or Receive Terminal 14), the required spatial search, and the available (typically limited) acquisition time, without also providing a bank of parallel correlators, such as Rake receivers, to achieve rapid PN code detection.

A spread spectrum modulator 11A at the Central Terminal 11 modulates data to be transmitted at data rate $R_i$, where $R_i$ is selected from the set $\{R_0, R_1, \ldots R_{n-1}\}$, where n is a maximum number of data rates. The selection of the transmitted data rate $R_i$ determines which PN code is selected, as will be described in detail below. If the data rate $R_i$ is changed at any time, the corresponding transmitted PN code also changes in accordance with a pre-defined mapping of the data rate $R_i$ and corresponding PN code $P_i$, where $i=0,1,\ldots n-1$.

After the data is modulated with the spread spectrum PN code in the Spread Spectrum Modulator 11A, the spread signal is transmitted over the link 17, via the omni-directional antenna 12, to the directional antenna 13 of one or more of the Receive Terminals 14.

In order to receive the signal from the link 17, the Receive Terminal 14 performs a spatial search for the Central Terminal 11, since its spatial location may be unknown. It will be appreciated that since the Receive Terminal antenna 13 is directional, and may have a narrow beamwidth, that decreasing the acquisition time of the received signal is important if the Receive Terminal 14 is to acquire the signal from the link 17.

A GPS system 15, 16 may be used to facilitate the PN code acquisition and rate discovery process, as will be described below. An alternative method for accomplishing the rate discovery process is also described below.

Figure 2A:
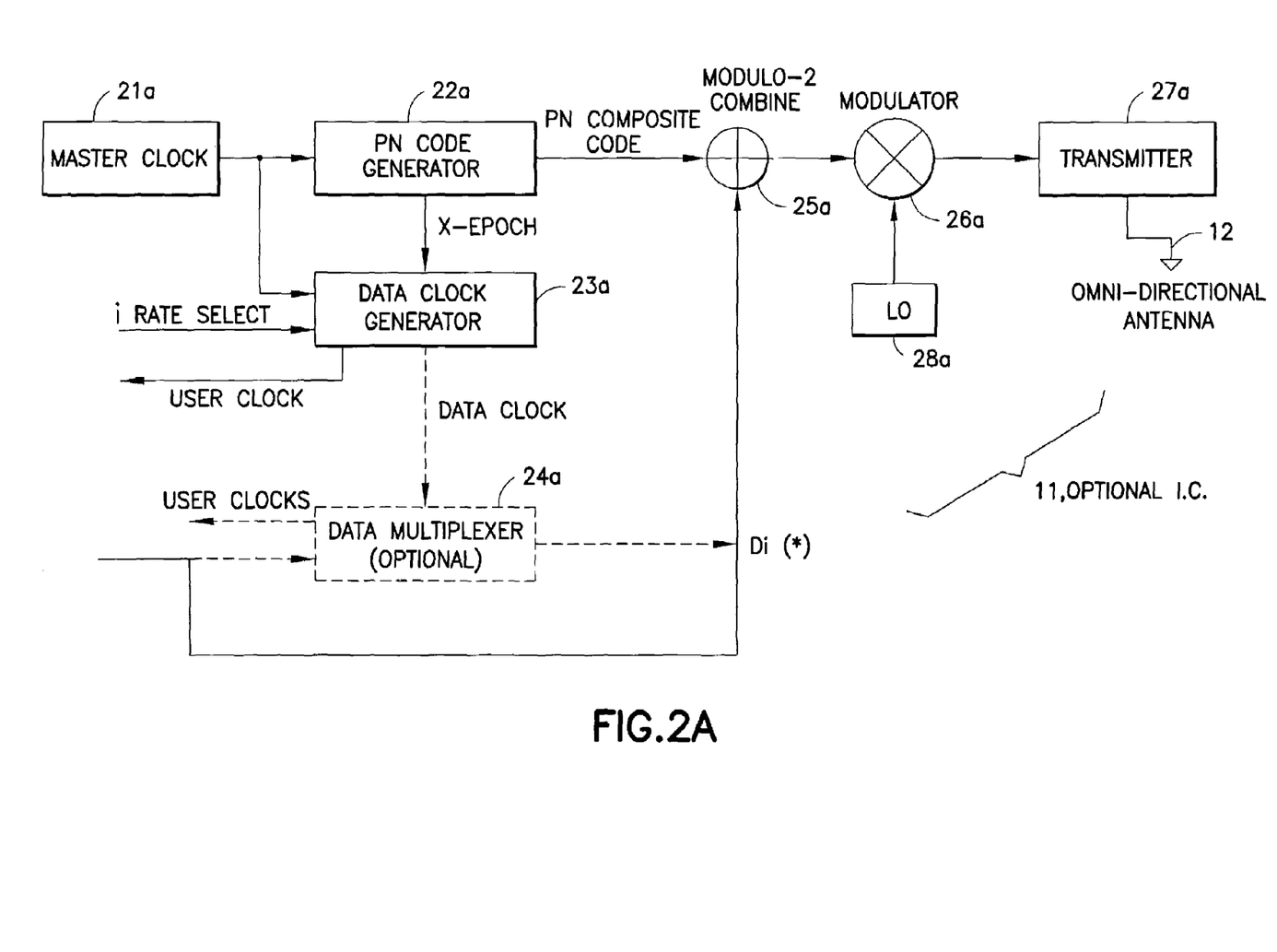
FIG. 2A is a detailed block diagram of the spread spectrum transmitter shown in FIG. 1.
Figure 2B:
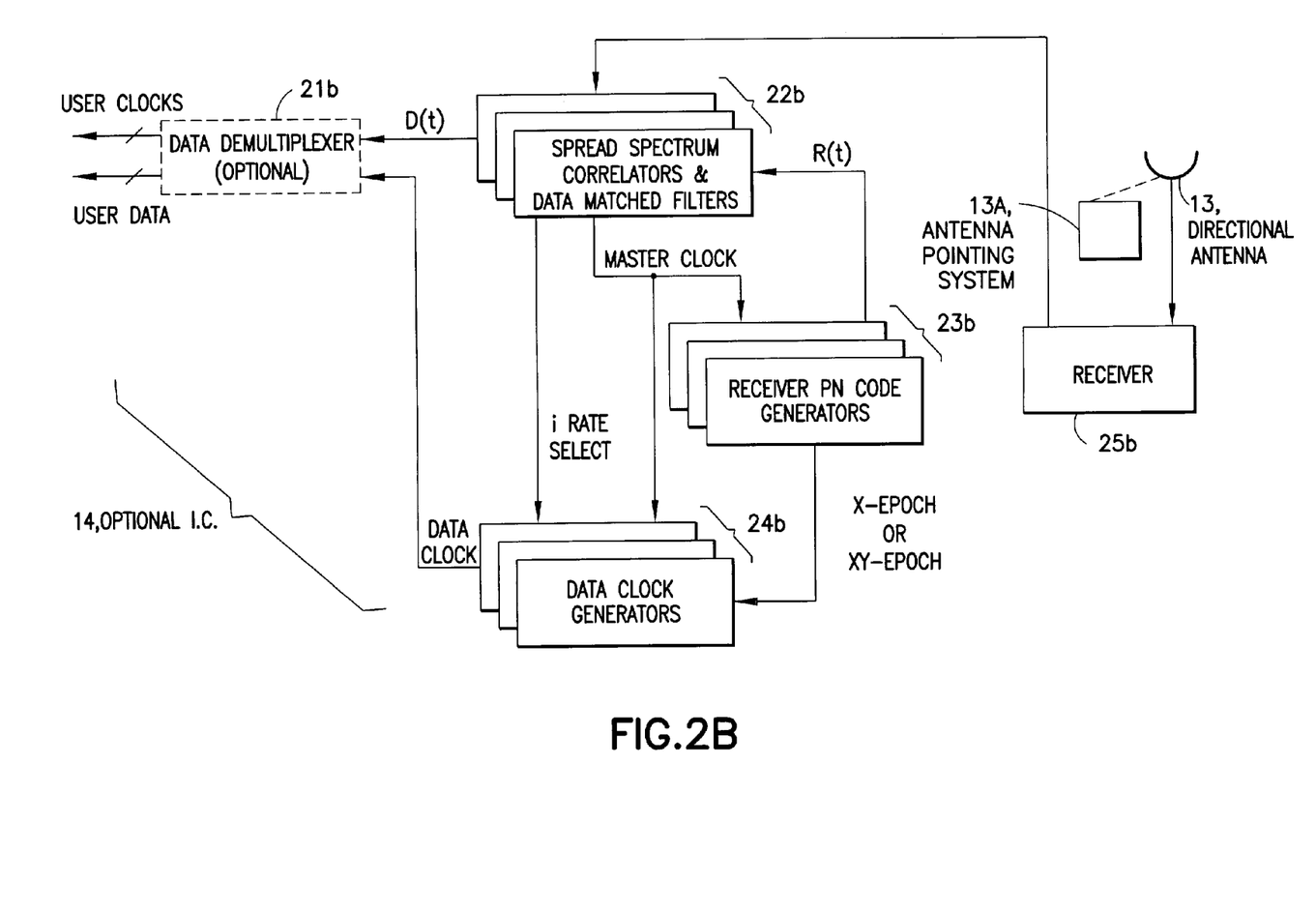
FIG. 2B is a detailed block diagram of the spread spectrum receiver shown in FIG. 1.

Reference is now made to FIGS. 2A and 2B, collectively referred to as FIG. 2, for showing a detailed system block diagram that illustrates more clearly the various functions of the Central Terminal 11 and Receive Terminal 14, respectively.

Referring first to FIG. 2A, a master clock 21a runs at a desired DSSS chipping rate. The master clock 21a output is provided to drive PN Code Generator 22a to generate the desired PN code $P_i(t)$ in accordance with a desired data rate "i". This is accomplished by "mapping" the data rate index (i), the data rate ($R_i$), and the PN code ($P_i$) in a pre-defined manner as shown in the following Table 1.

TABLE 1

| Rate index "i" | Data Rate | PN Code | MAND PN Code Structure | MOD PN Code Structure |
|---|---|---|---|---|
| 0 | $R_0$ | $P_0$ | $X_0 \oplus (Y \cdot Z)$ | $X_0 \oplus Y \oplus Z$ |
| 1 | $R_1$ | $P_1$ | $X_1 \oplus (Y \cdot Z)$ | $X_1 \oplus Y \oplus Z$ |
| ... | ... | ... | ... | ... |
| n − 1 | $R_{n-1}$ | $P_{n-1}$ | $X_{n-1} \oplus (Y \cdot Z)$ | $X_{n-1} \oplus Y \oplus Z$ |

PN code $P_i(t)$, constructed in accordance with teachings of the present invention, exhibits unique component code correlation properties that are determined by proper selection of X-code, Y-code, and Z-code component codes, as explained below.

In particular, the X-code is selected such that the cross-correlation between the X-code and the composite PN (XYZ) code has desired cross-correlation properties. One suitable code structure is defined in commonly assigned U.S. application Ser. No. 10/085,610, filed Feb. 26, 2002, now U.S. Pat. No. 6,994,211 "Method and System for Deriving Dynamic Data Clocks from PN Codes", by Vaughn L. Mower, Merle L. Keller and Kent R. Bruening, incorporated by reference herein in its entirety. The construction of each of the component X, Y and Z codes is summarized below.

X-Code: The X-code length is preferably selected to be of length $2^k$. This code contains only the prime number "2", and thus can be used generate binary (2,4,8 . . . ) data clock divisions that are leading-edge coincident with the X-epoch (i.e., with the phase of the PN code at which the X-code begins to repeat). Other non-binary integer values are not integer-divisible into the X-code length and, if generated, would not provide an unambiguous data clock relationship between the transmitter and receiver. The X-code may be generated by inserting a "1" (or "0") after the X-epoch of a maximum length code of length $2^k-1$.

It should be noted that "leading edge" coincidence is used as an example. In alternate embodiments trailing-edge coincidence could be used. Note further that the X-code of binary length may be derived from a maximal length code because of the ease of generating this "binary" code with minimum hardware, and because the auto-correlation and cross-correlation properties of this code are reasonably well known. Other codes that have acceptable auto-correlation and cross-correlation properties may also be used.

Y-Code: The length of the Y-code is determined by a set of prime numbers describing the Y-code sequence. The Y-code is preferably a maximal length code $2^m-1$, where m is an integer value and contains the prime numbers required to enable the generation of the desired data rate divisions Z-Code: The Z-code need not be used in the generation of data clocks. The Z-code is preferably selected to include prime numbers that are "relatively prime" (i.e., numbers having no shared multiplicands) to the X-code and Y-code sequences.

The composite PN code is logically constructed from the X, Y, and Z-component codes using, in the preferred embodiment, a MAND operation:

$$\text{MAND} = X \oplus (Y \cdot Z) \quad \text{(Eq. 1)}$$

The MANDed code is useful for the partial correlation properties of the X-code to the MAND code. This correlation is a 50% (½) correlation when the receiver=s X-code is phased aligned with the received MAND code. Once the X-code correlation is obtained, the search for the Y- and Z-code phases may be accomplished as described in commonly assigned U.S. patent application Ser. No. 10/014,058, filed Dec. 6, 2001, now U.S. Pat. No. 7,054,350 "Method and System for Acquiring Pseudo-Noise (PN) Decade-Code Phase", by Merle L. Keller, Vaughn L. Mower and Steven J. McEntire, incorporated by reference herein in its entirety. It will be appreciated that the lengths of the composite MAND codes can be very long and can generate a composite PN code length that may be days, weeks, years or even decades long. Thus, if the composite MAND zero code phase position is unknown, it is first necessary to search (correlate) one of the component codes, preferably the X-code (the shortest code), with the composite code phase, followed by the Y-code and the Z-code phases.

Figure 3:
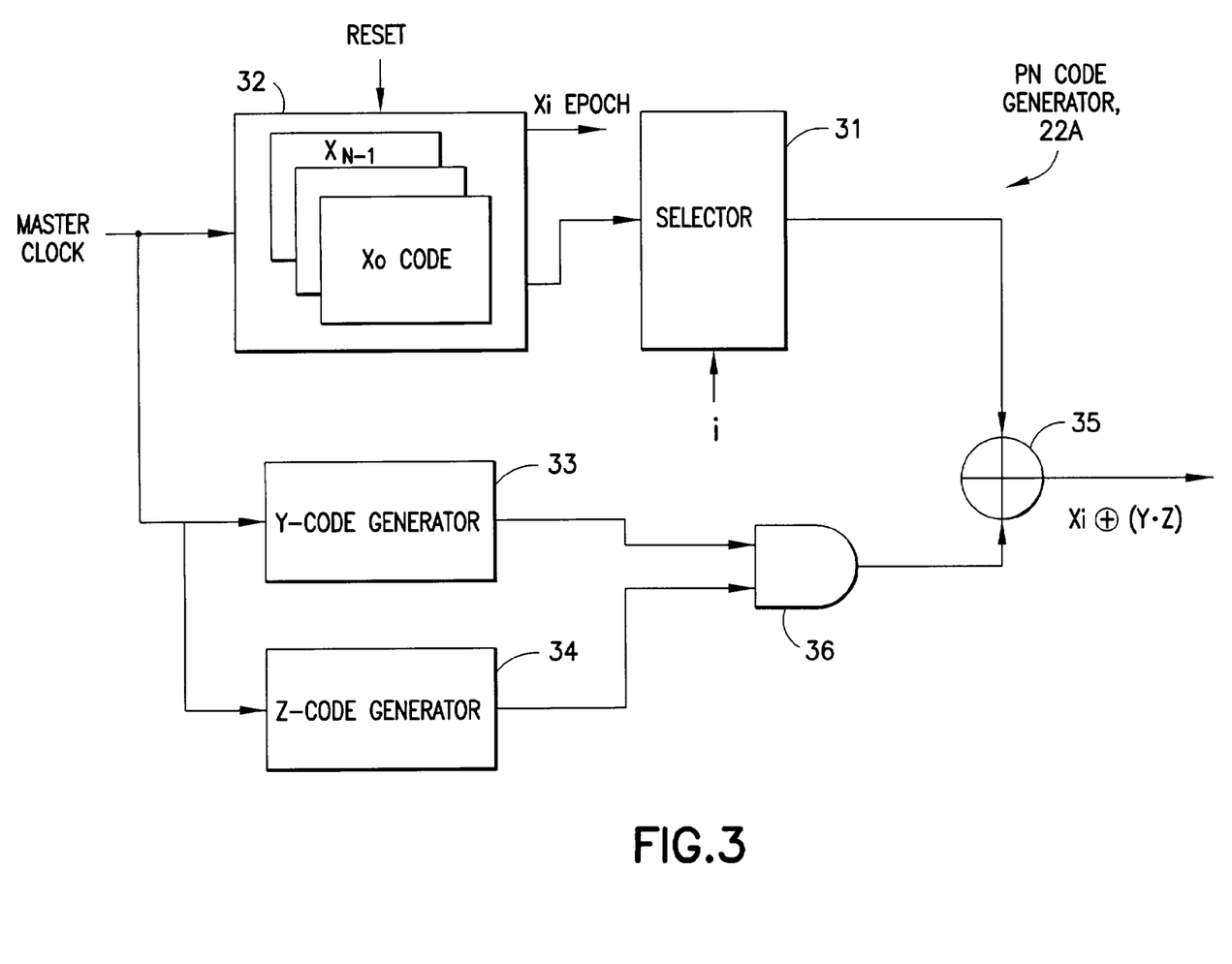
FIG. 3 is a block diagram showing component code selection features of the present invention shown in FIGS. 2A and 2B.

Referring also to FIG. 3, the PN Code Generator 22a of FIG. 2A is constructed to include one or more equal-length X-code generators 32 that can be implemented by separate generator circuitry, or by a single programmable X-code generator that is programmed to provide PN code $X_i$ from a programmable subset $\{X_0, X_1, \ldots X_{n-1}\}$. If data rate $R_1$ is selected, for example, then a code selector 31 may be commanded to select X-Code $X_1$. Alternatively, a single programmable PN generator could be programmed to provide $X_1$. In the three component code embodiment code generators 33 and 34 are the Y-code generator and Z-code generator, respectively. The codes are logically combined via gates 36 and 35 to produce the composite MAND code $P_i = X_i \oplus (Y \cdot Z)$, as was shown above in Equation 1. The X-code set $\{X_0, X_1, \ldots X_{n-1}\}$ is selected so as to exhibit desired partial cross-correlation properties between the selected X-code ($X_i$) and the composite MAND code $X \oplus (Y \cdot Z)$.

The data rate selection $R_i$ is user dependent. For the example given herein, a data rate is programmable in octave steps beginning at the highest rate $R_0$, next highest rate $R_1$, etc. Thus, in this example, the data rates have the relationship $R_1 = R_0/2$, $R_2 = R_0/4$, or, in general, $R_i = R_0/2^i$, which provides the means for establishing a direct data clock relationship that depends on the properties of the binary X-code (i.e., X-code=$2^k$), and does not require a look-up table.

As is described in the above referenced U.S. patent application Ser. No. 10/085,610, now U.S. Pat. No. 6,994,211 any suitable data rate selections that exploits the relationship between the X-code component and the Y-code component may be used.

Referring again to FIG. 2A, data clock generator 23a generates a synchronous data clock signal at $R_i$ Hz to drive an optional Data Multiplexer 24a, or it outputs the clock signal directly to user equipment (not shown). The optional Data Multiplexer 24a multiplexes user data in the selected data format to generate the aggregate data stream $D_i(t)$ to modulo-2 combiner 25a, as shown. The output of the modulo-2 combiner 25a, $S_i(t) = P_i(t)rD_i(t)$, is RF modulated by modulator 26a and local oscillator 28a; and transmitted by a transmitter 27a via omni-directional antenna 12. Note that the PN code $\{P_0, P_{1,Y} P_{n-1}\}$ and aggregate data "i" subscript denote that the PN-code selection and data rate selection are dependent on the desired data rate $R_i$ from a possible rate set $\{R_0, R_1, Y R_{n-1}\}$.

Referring to FIG. 2B, a receiver 25b of the Receive Terminal 14 acquires the received PN code $P_i(t)$ from the directional antenna 13 and demodulates the data stream to retrieve data $D_i(t)$. In a preferable embodiment, the received PN code is parallel searched in order to minimize acquisition time (spatial search plus data rate search) of the system. Parallel sets of spread spectrum correlators and data matched filters 22b, PN code generators 23b, and data clock generators 24b are used to minimize the acquisition time. An i-rate select signal is output to the data clock generators 24b for use in generating the data clock signal from the master clock signal. An optional data demultiplexer 21b can be used to output demultiplexed user data and user clocks. This circuitry may be implemented digitally in a programmable or non-programmable application specific integrated circuit(s) (ASICs). It should be noted that the use of data multiplexers and demultiplexers may only be desirable for digital data streams having a plurality of data channels.

A desired end result is to provide inputs to an antenna tracking system 13A to enable the receive antenna 13 to rapidly and accurately acquire and track the transmit antenna 12, it being remembered that one or both of the transmitter 11 and receiver 14 may be in motion relative to the other.

Figure 4:
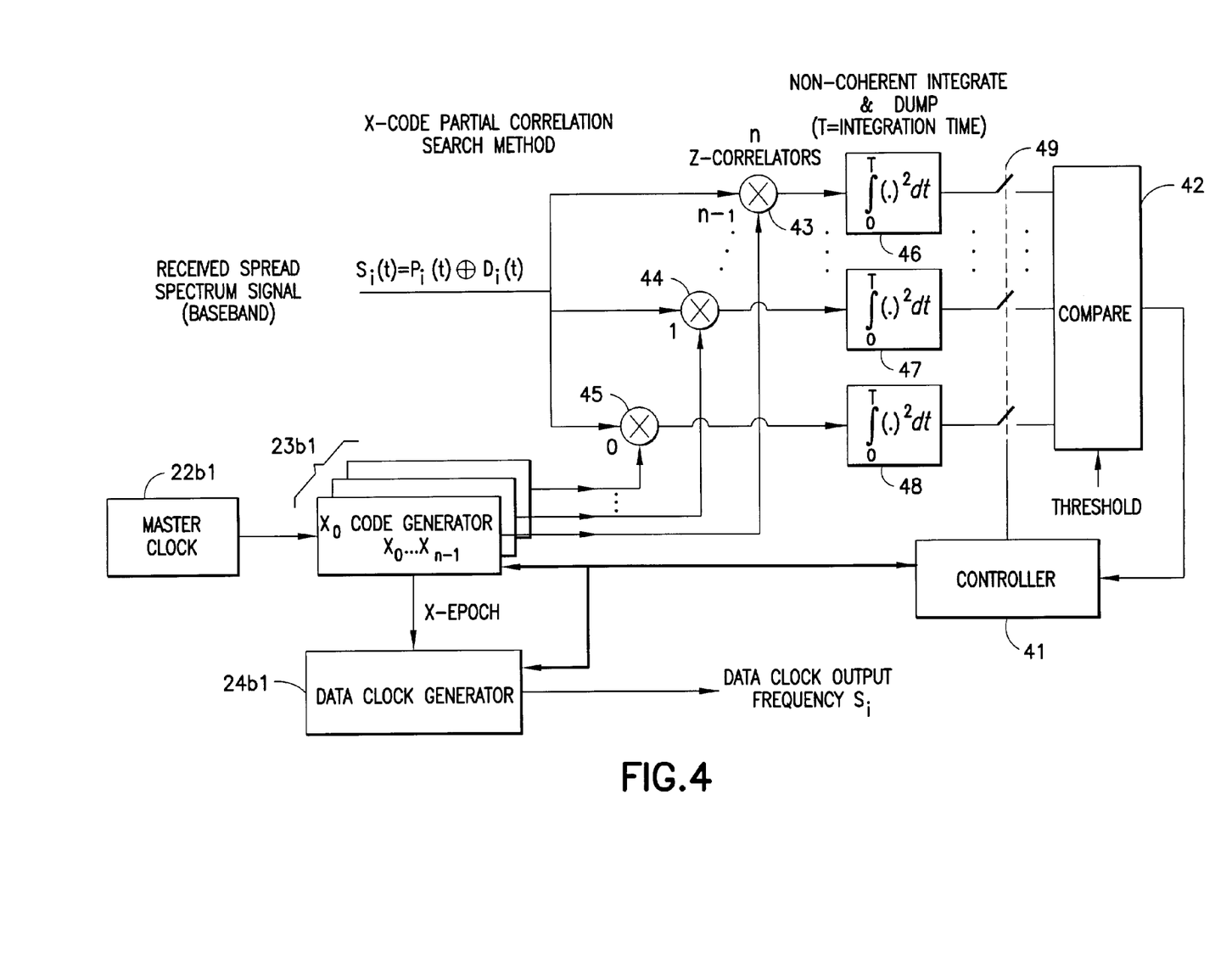
FIG. 4 is a block diagram showing component code partial correlation features in accordance with teachings of the present invention.
Figure 4A:
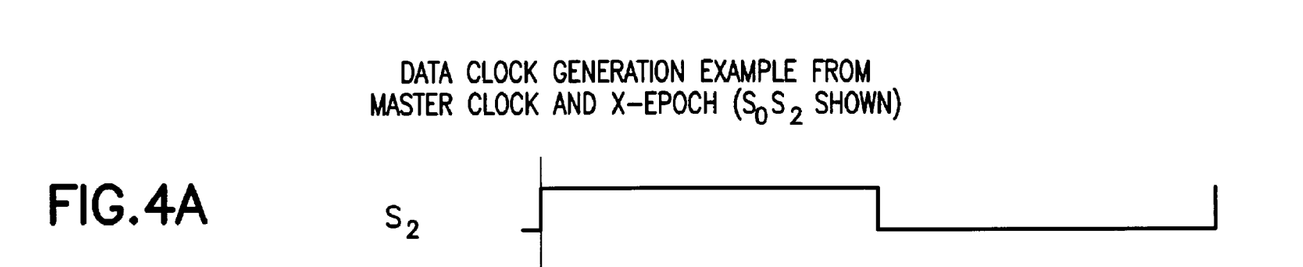
FIGS. 4A–4E are timing diagrams showing timing relationships between data clocks, master clock, and X-epoch generators shown in FIG. 4.
Figure 4B:
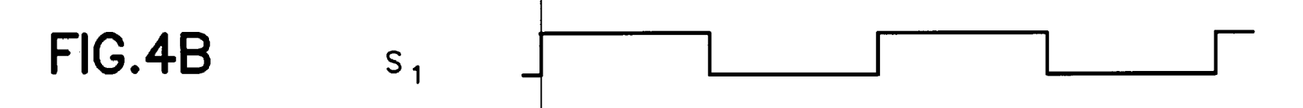
Figure 4C:
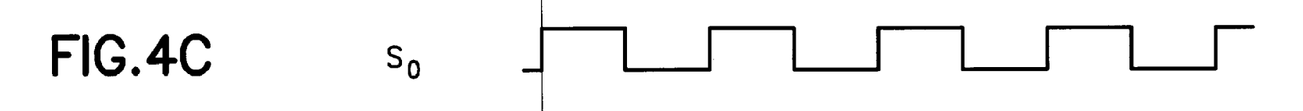
Figure 4D:
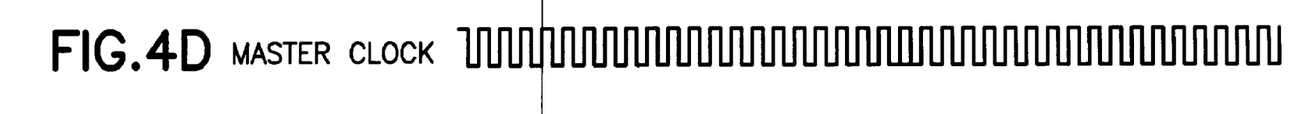

FIG. 4 illustrates a detailed block diagram showing functions of the PN detection circuitry 22b of FIG. 2B. The embodiment shown in FIG. 4 applies to a partial correlation search method that is preferable when GPS, or some other common time-base between the Central Terminal 11 and the Receive Terminal 14 is unavailable.

For example, if data rate $R_3$ and corresponding PN code $P_3$ were transmitted by the Central Terminal 11 transmitter, the output of correlator 48 will eventually exceed (during the search process) the detection threshold. Once data rate $R_3$ is determined as the received rate, the data matched filter (not shown here) and the data clock generator 24b1, are programmed to demodulate data according to the $R_3$ data rate and to provide the $R_3$ data clock, respectively.

The illustrated embodiment operates to parallel-phase correlate a local X-code $\{X_0, X_1, X_2, \ldots X_{1-1}\}$, generated in the X-code generator 23b1, with the received spread spectrum (baseband) signal. Alternatively, each X-code could be sequentially searched for possible correlation at the expense of additional time required for the search process. In the embodiment of FIG. 4 a plurality of X correlators 43–45, each operating with a different X-code output from X code generator 23b1, provide correlation outputs to non-coherent integrate and dump blocks 46–48, having outputs that are compared in block 42 to a threshold, all under control of control unit 41.

Figure 4E:
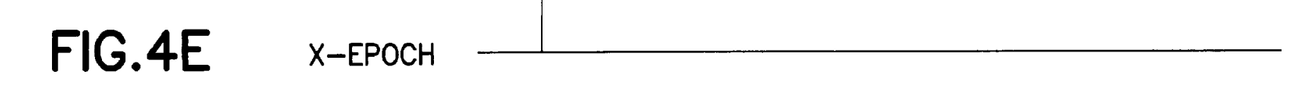

Referring also to FIGS. 4A–4E, there are shown timing diagrams of the outputs of the data sample clock generators 24b1 in relationship to the X-epoch (FIG. 4E). The data clocks are derived from the master clock 22b1 and are synchronously reset with the occurrence of the X PN epoch. There is preferably no dependence on the Y-code or Z-code for PN detection, rate determination, or generation of the required data clocks to the demultiplexer (not shown in this figure). The X-code generators 23b1 are preferably all of the same length, and are reset at the same time such that all X-code epochs occur simultaneously. Hence, it is arbitrary which of the X-code epochs is used to generate the sampling clocks. The timing diagrams 4A–4E illustrate that the data clocks $s_0$–$s_2$ are synchronous with the X-code epoch (the phase of the PN code at which the X-code begins to repeat), thus advantageously obviating a separate bit synchronizer.

For the embodiment illustrated in FIGS. 4A–4E the data sample clocks are derived from the X-code by binary divisions of the PN master clock 22b 1, and are synchronous with the X-epoch. In this embodiment the highest data rate (data clock 4C), $R_0$, is obtained by dividing the master clock by $8 \times 2^0 = 8$. The second highest sample clock is derived by dividing the master clock by $8 \times 2^1 = 16$, and so forth. This provides eight PN chips per data bit. This number can be variable, depending on the application, but eight PN chips per data (or encoded symbol with forward error correction coding) is generally considered the minimum number of bits (or symbols for a forward error-correction encoded system) necessary to properly implement a DSSS system.

Note that the highest data rate may be defined as follows: one symbol at the highest data (symbol) rate possible, given the master clock frequency; or as one chip at the highest chipping rate possible, given the master clock. The lowest data rate is the master clock divided by $2^n$.

Note further that data boundaries may be defined by X-only epochs, as well as by X-Y epochs.

Figure 5:
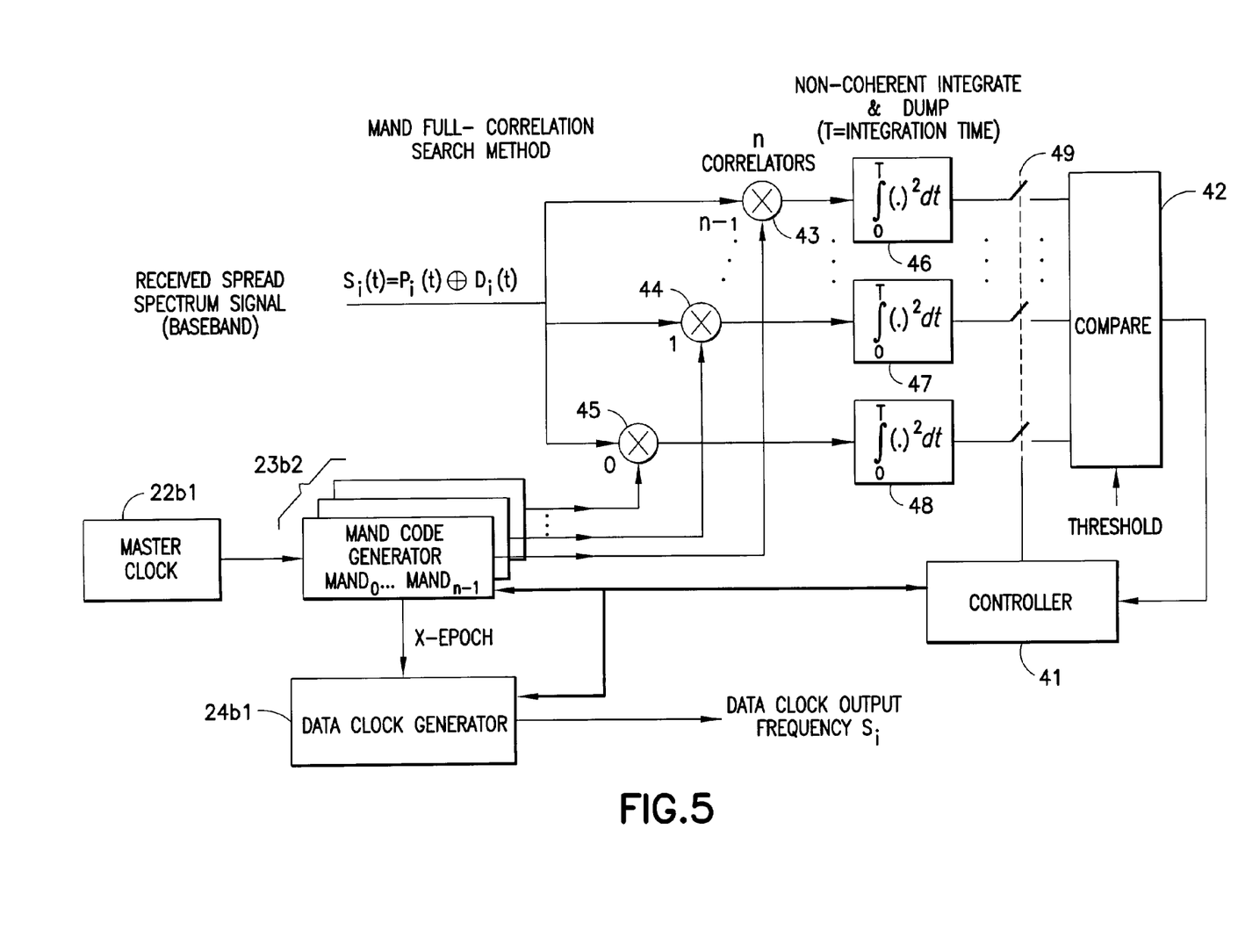
FIG. 5 is a block diagram showing full MAND code correlation features in accordance with teachings of the present invention.
Figure 5A:
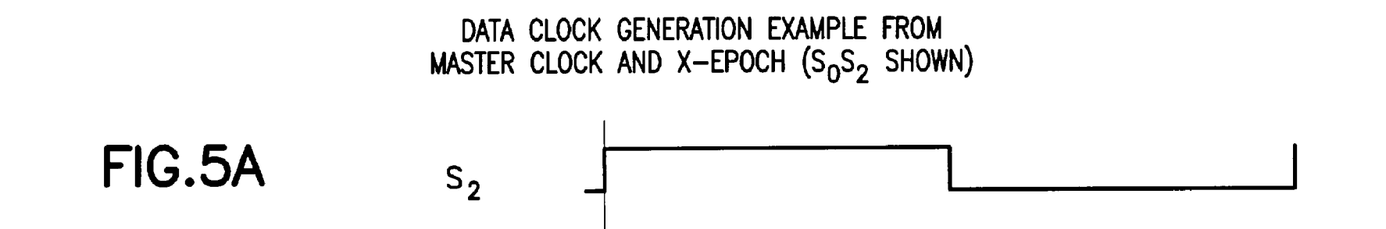
FIGS. 5A–5E are timing diagrams showing timing relationships between data clocks, master clock, and X-epoch generators shown in FIG. 5.
Figure 5B:
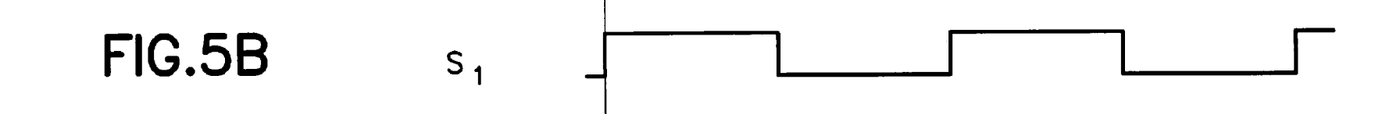
Figure 5C:
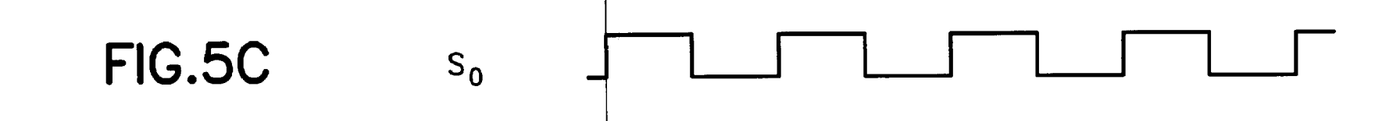
Figure 5D:
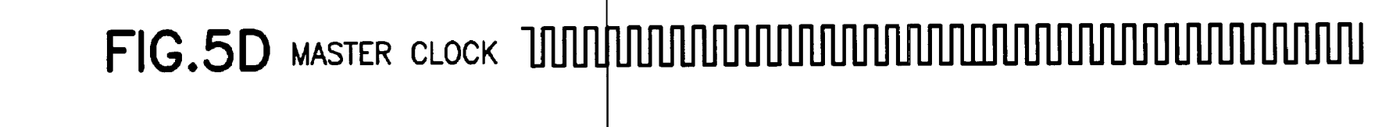
Figure 5E:
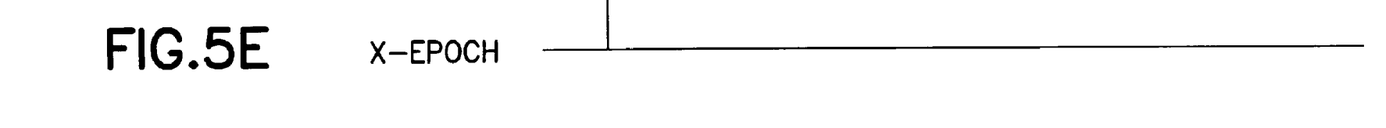

Referring now to FIG. 5, there is shown a Full-Correlation Search embodiment of the present invention. FIG. 5 is similar to the embodiment described above with regard to FIG. 4, and differs most significantly in the use of parallel MAND code generators 23b2 (not simply X-code generators) to provide inputs to the correlators 43–45. This embodiment is preferred when there exists a common time event, such as GPS time, between the Central Terminal 11 and the Receive Terminal 14, and when the transmit and receive PN codes can be positioned as described in U.S. patent application Ser. No. 10/014,058.

Figure 6:
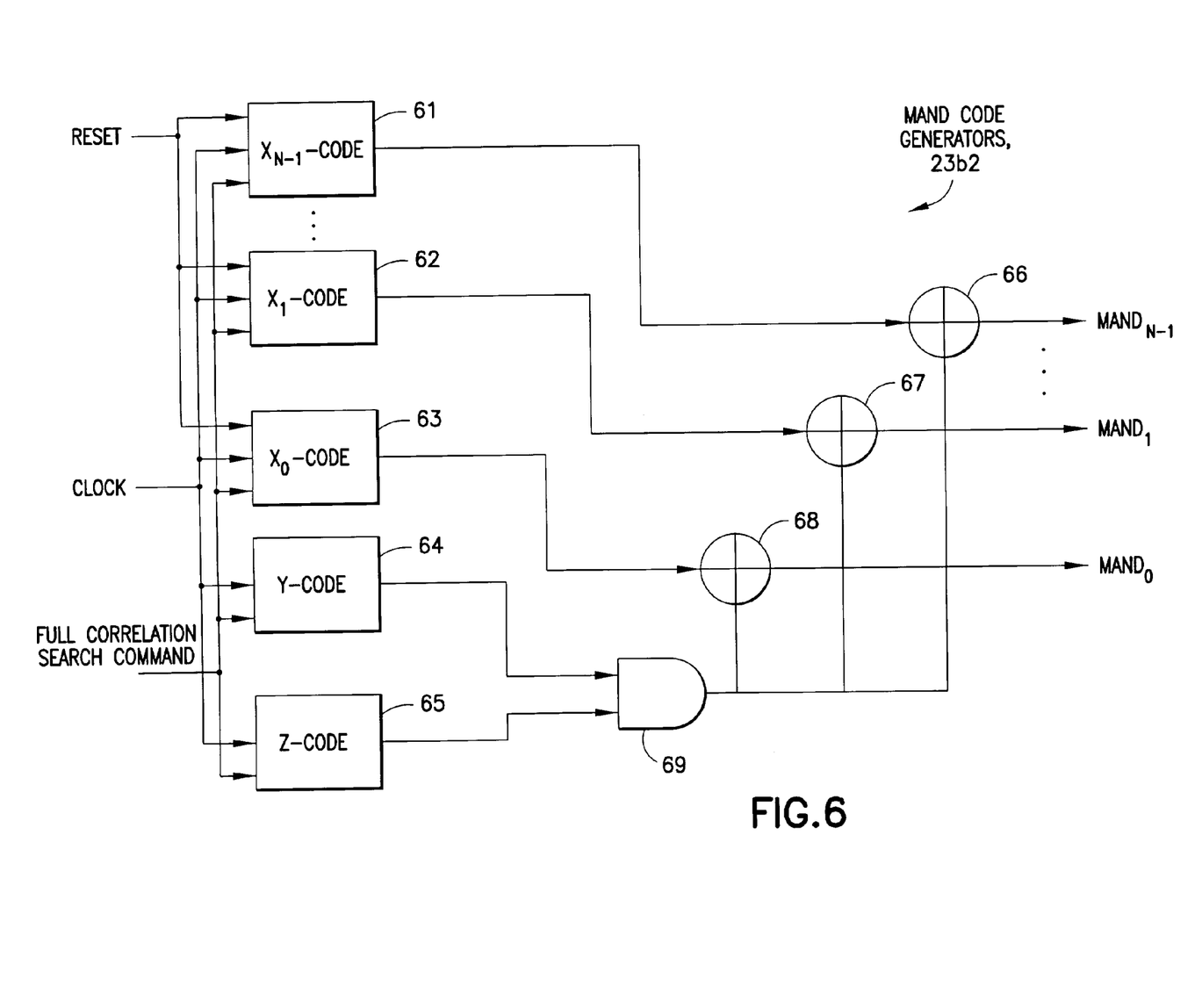
FIG. 6 is a block diagram showing MAND code generation features as shown in FIG. 5.

The MAND code generators 23b2 of FIG. 5 are shown more specifically in FIG. 6. AND gate 69 logically combines the Y and Z codes generated by Y and Z code generators 64 and 65, respectively. The logically ANDed output is then logically, exclusively-ored (XORed) with each of the $X_i$ codes generated by each of the X code generators 61, 62, 63 by corresponding XOR gates 66–68, for i=0 . . . n−1, where n is predetermined. In alternate embodiments the $X_i$ codes may be generated by a sequential $X_i$ code generator. It will be appreciated that the search time penalty associated with the full-correlation search embodiment is minimal since the X-code, Y-code, and Z-code are searched substantially simultaneously, given small uncertainties due to common time, as can exist with GPS time.

In preferred embodiments, the MAND code is transmitted to permit the Receive Terminal 14 to execute either a Partial-Correlation Search or a Full-Correlation Search. In an alternate Full-Correlation Search embodiment, the PN component codes may be MOD logically combined.

Figure 7:
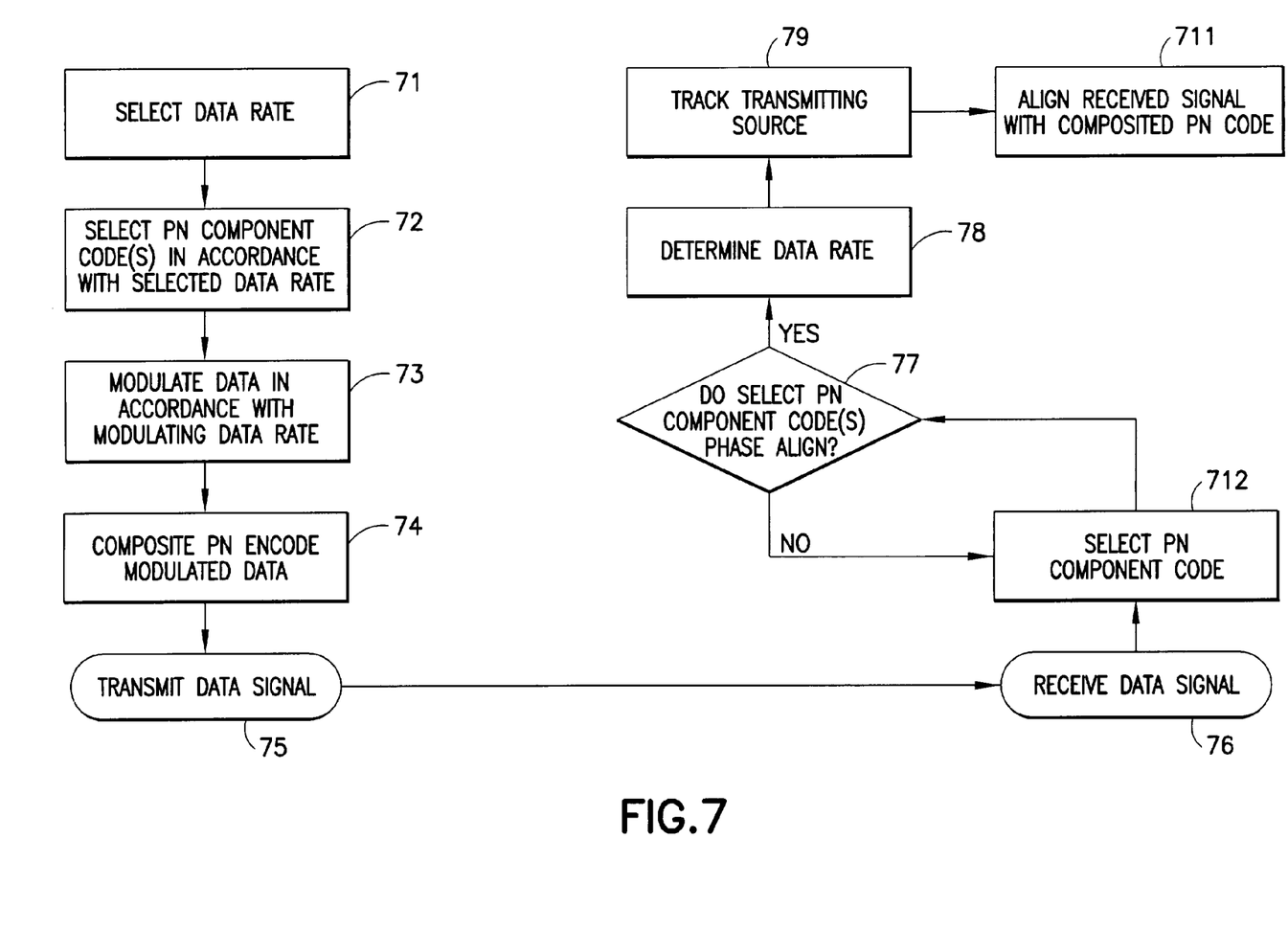
FIG. 7 is a method flow chart showing steps for one method that is suitable to implement features of the present invention shown in FIG. 1.

FIG. 7 is a method flow chart showing steps for a method implementing features of the present invention shown in FIGS. 4 and 5. Step 71 selects a desired data rate. Step 72 uses the desired data rate to select a PN component code having suitable cross-correlation properties with the PN composite code, as described above. Step 73 modulates the data in accordance with the selected data rate, step 74 spreads the data according to the composite PN code and step 75 transmits the DSSS signal.

Step 76 receives the DSSS signal and step 712 selects PN component code(s) to phase align with the received data signal. Step 712 can involve using any desired number of instances of parallel/rake correlators to achieve fast acquisition. Step 77 tests phase alignment of the selected PN component code(s). If step 77 fails to align the selected PN component code(s), step 712 selects another PN component code to test for alignment with the received signal. Once the signal has been partially phase aligned, step 78 determines the data rate used by step 73 and demodulates the signal. Step 79 uses data from the demodulated signal to track, or lock on to, the transmitting source. Step 711 then fully phase aligns the received signal with the composite PN code. It will be appreciated that steps 79 and 711 may occur simultaneously or near simultaneously.

It will be further appreciated that the invention advantageously makes unnecessary prior art methods requiring short PN codes and/or multiplexers/demultiplexers in order to accomplish antenna pointing.

As can be appreciated based on the foregoing description, in alternate embodiments the data rates may be derived from combinations of the X-Code and Y-code (i.e., XY epochs), or from the XYZ epochs.

The invention describes an advantageous method for performing simultaneous (parallel) spatial and data rate searches of the PN (XYZ) encoded spread spectrum signal with a narrow-beam, high-gain antenna.

In preferred embodiments the Central Terminal 11 modulator and the Receive Terminal 14 demodulator may be programmable devices, and may be implemented within integrated circuits (ICs). It will be further appreciated that the ICs may be field programmable gate arrays (FPGA), application specific ICs (ASIC), or a function of firmware. The operation of the ICs, or firmware, may be defined by a suitable programming language. One suitable language is one known as a Very High Speed Integrated Circuit (VHSIC) or VHSIC Hardware Description Language (VHDL) file.

What is claimed is:

1. A method to transmit a modulated signal from a transmitter to a receiver, the modulated signal having a data rate, comprising:

selecting, to represent the data rate, at least one pseudonoise (PN) component code from a set of PN component codes, the PN component code being a constituent code of a composite PN code comprised of a plurality of PN component codes, the selected PN component code being one that phase aligns with a PN composite encoded signal; and modulating the signal to be transmitted using the PN composite code that includes the selected PN component code.

2. A method as in claim 1, further comprising receiving the modulated signal, demodulating the received signal using a demodulation process and discovering the data rate during the demodulation process.

3. A method as in claim 2, where the demodulation process includes generating instances of a plurality of PN component codes, and correlating the received modulated signal either sequentially or in parallel with the instances of the PN component codes.

4. A method as in claim 2, where the demodulation process includes generating instances of a plurality of PN component codes, and correlating the received modulated signal using one of a partial correlation search method or a full correlation search method using the generated instances of the PN component codes.

5. A method as in claim 2, where the demodulation process includes generating p instances of PN component codes, and correlating the received modulated signal using p correlators in parallel.

6. A method as in claim 2, where the demodulation process includes generating p instances of PN component codes, and correlating the received modulated signal using p rake correlators in parallel.

7. A method as in claim 2, further comprising controllably pointing a receive antenna at a transmit antenna using the demodulated received signal.

8. A method as in claim 1, where modulating comprises operating a plurality of PN component code generators each generating PN codes whose prime factors are unique from each of the other PN codes, where at least two of the plurality of PN component codes have at least one common epoch point.

9. A method to transmit a modulated signal from a transmitter to a receiver, the modulated signal having a data rate, comprising:
selecting, to represent the data rate, at least one pseudo-noise (PN) component code from a set of PN component codes, the PN component code being a constituent code of a composite PN code comprised of a plurality of PN component codes, the selected PN component code being one that phase aligns with a PN composite encoded signal; and
modulating the signal to be transmitted using the PN composite code that includes the selected PN component code,
where the composite PN code comprises an X PN component code, a Y PN component code and a Z PN component code, each component code having an epoch of a different duration such that the X PN component code epoch is shorter than the Y PN component code epoch, and such that the Y PN component code epoch is shorter than the Z PN component code epoch.

10. A method as in claim 9, where the selected PN component code comprises the X PN component code.

11. A method as in claim 10, where the data rate $R_i$ is selected from a set of data rates $\{R_0, R_1, \ldots, R_{n-1}\}$, and where modulating comprises operating a MAND PN code combiner for combining the selected X PN component code with Y and Z PN component codes to produce the PN composite code according to $X_i \oplus (Y \cdot Z)$.

12. A method as in claim 9, where the selected PN component code comprises the X PN component code and the Y PN component code.

13. A method as in claim 12, where the data rate $R_i$ is selected from a set of data rates $\{R_0, R_1, \ldots, R_{n-1}\}$, and where modulating comprises operating a MAND PN code combiner for combining the selected X PN component code and selected Y PN component code with the Z PN component code to produce the PN composite code according to $X_i \oplus (Y \cdot Z)$.

14. A communications system comprising a transmitter and a receiver, said transmitter transmitting a modulated signal from a transmit antenna to a receive antenna of said receiver, the modulated signal having a data rate, comprising a control unit for selecting, to represent the data rate, at least one pseudo-noise (PN) component code from a set of PN component codes, the PN component code being a constituent code of a composite PN code comprised of a plurality of PN component codes, the selected PN component code being one that phase aligns with a PN composite encoded signal; a modulator for modulating the signal to be transmitted using the PN composite code that includes the selected PN component code; said receiver comprising a receive antenna pointing system for spatially acquiring said transmit antenna, said receive antenna pointing system comprising a demodulator for demodulating the received signal using a demodulation process for discovering the data rate during the demodulation process.

15. A communications system as in claim 14, where said receiver comprises circuitry for generating instances of a plurality of PN component codes, and said demodulator comprises circuitry for correlating the received modulated signal either sequentially or in parallel with the instances of the PN component codes.

16. A communications system as in claim 14, where said modulator comprises a plurality of PN component code generators each generating PN codes whose prime factors are unique from each of the other PN codes, where at least two of the plurality of PN component codes have at least one common epoch point.

17. A communications system as in claim 14, where said demodulator comprises circuitry for generating instances of a plurality of PN component codes, and a correlator for correlating the received modulated signal using one of a partial correlation search method or a full correlation search method using the generated instances of the PN component codes.

18. A communications system as in claim 14, where said demodulator comprises circuitry for generating p instances of PN component codes, and a correlator for correlating the received modulated signal using p correlators in parallel.

19. A communications system as in claim 14, where said demodulator comprises circuitry for generating p instances of PN component codes, and a correlator for correlating the received modulated signal using p rake correlators in parallel.

20. A communications system comprising a transmitter and a receiver, said transmitter transmitting a modulated signal from a transmit antenna to a receive antenna of said receiver, the modulated signal having a data rate, comprising a control unit for selecting, to represent the data rate, at least one pseudo-noise (PN) component code from a set of PN component codes, the PN component code being a constituent code of a composite PN code comprised of a plurality of PN component codes, the selected PN component code being one that phase aligns with a PN composite encoded signal; a modulator for modulating the signal to be transmitted using the PN composite code that includes the selected PN component code; said receiver comprising a receive antenna pointing system for spatially acquiring said transmit antenna, said receive antenna pointing system comprising a demodulator for demodulating the received signal using a demodulation process for discovering the data rate during the demodulation process, where the composite PN code comprises an X PN component code, a Y PN component code and a Z PN component code, each component code having an epoch of a different duration such that the X PN component code epoch is shorter than the Y PN component code epoch, and such that the Y PN component code epoch is shorter than the Z PN component code epoch.

21. A communications system as in claim 20, where the selected PN component code comprises the X PN component code.

22. A communications system as in claim 21, where the data rate $R_i$ is selected from a set of data rates $\{R_0, R_1, \ldots, R_{n-1}\}$, and where said modulator comprises a MAND PN code combiner for combining the selected X PN component code with Y and Z PN component codes to produce the PN composite code according to $X_i \oplus (Y \cdot Z)$.

23. A communications system as in claim 20, where the selected PN component code comprises the X PN component code and the Y PN component code.

24. A communications system as in claim 23, where the data rate $R_i$ is selected from a set of data rates $\{R_0, R_1, \ldots, R_{n-1}\}$ and where said modulator comprises operating a MAND PN code combiner for combining the selected X PN component code and selected Y PN component code with the Z PN component code to produce the PN composite code according to $X_i \oplus (Y \cdot Z)$.

25. A method to transmit a modulated signal from a transmitter to a receiver, the modulated signal having a data rate $R_i$ selected from a set of data rates $\{R_0, R_1, \ldots R_{n-1}\}$, comprising:

selecting, to represent the data rate, at least one pseudo-noise (PN) component code from a set of PN component codes, the PN component code being a constituent code of a composite PN code comprised of a plurality of PN component codes, where the composite PN code comprises an X PN component code, a Y PN component code and a Z PN component code, each component code having an epoch of a different duration such that the X PN component code epoch is shorter than the Y PN component code epoch, and such that the Y PN component code epoch is shorter than the Z PN component code epoch; and modulating the signal to be transmitted using the PN composite code that includes the selected PN component code, where modulating comprises operating a MAND PN code combiner for one of combining a selected X PN component code with Y and Z PN component codes to produce the PN composite code according to $X_i \oplus (Y \cdot Z)$, or combining a selected X PN component code and a selected Y PN component code with the Z PN component code to produce the PN composite code according to $X_i \oplus (Y \cdot Z)$.

26. A method as in claim 25, further comprising transmitting and then receiving the modulated signal, and executing one of a Partial-Correlation Search or a Full-Correlation Search on the received modulated signal.

27. A method to transmit a modulated signal from a transmitter to a receiver, the modulated signal having a data rate $R_i$ selected from a set of data rates $\{R_0, R_1, \ldots, R_{n-1}\}$, comprising:

selecting, to represent the data rate, at least one pseudo-noise (PN) component code from a set of PN component codes, the PN component code being a constituent code of a composite PN code comprised of a plurality of PN component codes, where the composite PN code comprises an X PN component code, a Y PN component code and a Z PN component code, each component code having an epoch of a different duration such that the X PN component code epoch is shorter than the Y PN component code epoch, and such that the Y PN component code epoch is shorter than the Z PN component code epoch; and modulating the signal to be transmitted using the PN composite code that includes the selected PN component code, where modulating comprises operating a MOD PN code combiner for combining at least one selected PN component code with another PN component code or codes to produce the PN composite code according to $X_i \oplus Y \oplus Z$.

28. A method as in claim 27, further comprising transmitting and then receiving the modulated signal, and executing a Full-Correlation Search on the received modulated signal.

* * * * *